US012743654B2

(12) United States Patent
Allouche et al.

(10) Patent No.: US 12,743,654 B2
(45) Date of Patent: Sep. 22, 2026

(54) SYSTEM AND METHOD FOR GENERATING REPHRASED ACTIONABLE DATA OF TEXTUAL DATA

(71) Applicant: GONG.io Ltd., Ramat Gan (IL)

(72) Inventors: Omri Allouche, Tel Aviv (IL); Inbal Horev, Tel Aviv (IL); Ortal Ashkenazi, Kfar Saba (IL); Eyal Ben David, Kibbutz Yagur (IL); Geffen Huberman, Tel Aviv (IL); Adi Kopilov, Tel Aviv (IL); Raquel Sitman, Tel Aviv (IL)

(73) Assignee: GONG.io Ltd., Ramat Gan (IL)

( * ) Notice: Subject to any disclaimer, the term of this patent is extended or adjusted under 35 U.S.C. 154(b) by 1071 days.

(21) Appl. No.: 17/804,711

(22) Filed: May 31, 2022

(65) Prior Publication Data

US 2023/0385685 A1 Nov. 30, 2023

(51) Int. Cl.
*G06N 20/00* (2019.01)

(52) U.S. Cl.
CPC .................................... *G06N 20/00* (2019.01)

(58) Field of Classification Search
CPC ................................ G06N 20/00; G06F 40/30
See application file for complete search history.

(56) References Cited

U.S. PATENT DOCUMENTS 8,214,242 B2 7/2012 Agapi et al.
9,473,637 B1 10/2016 Venkatapathy et al.
10,733,380 B2 8/2020 Leidner et al.
10,885,906 B2 1/2021 Henderson et al.
2009/0119095 A1 5/2009 Beggelman et al.
2011/0099052 A1 4/2011 Brun et al.
2017/0083507 A1* 3/2017 Ho ...................... G06F 16/3347
2018/0122383 A1* 5/2018 Raanani .............. H04M 3/5175

(Continued)

FOREIGN PATENT DOCUMENTS

CA 2792570 C 5/2016
WO 2019016119 A1 1/2019

OTHER PUBLICATIONS

Anchit Bhattacharya. "Towards Controlled Generation of Text: A Summary: An easy-to-understand explanation of the research paper". Dec. 4, 2021. https://towardsdatascience.com/towards-controlled-generation-of-text-a-summary-7f4c954c1fad.

(Continued)

*Primary Examiner* — Jennifer N Welch
*Assistant Examiner* — Amy P Hoang

(57) ABSTRACT

A system and method for generating a rephrasing model for rephrased actionable data extracted from conversations is presented. The method includes receiving a training dataset including a plurality of training samples, wherein each training sample includes a textual data extracted from recorded conversations and at least one action item, wherein the at least one action item is a portion of the textual data; associating a control signal to each training sample of the training dataset, wherein the control signal is added to the associated training sample; and training a rephrasing model using the training dataset, wherein the rephrasing model is trained to paraphrase the at least one action item to output at least one actionable data, wherein each training sample of the training dataset is iteratively fed into the machine learning algorithm of the rephrasing model.

17 Claims, 6 Drawing Sheets

(56) References Cited

U.S. PATENT DOCUMENTS

| | | | | |
|---|---|---|---|---|
| 2020/0089768 | A1* | 3/2020 | Kim | G06N 5/02 |
| 2020/0265102 | A1 | 8/2020 | Ho et al. | |
| 2020/0279556 | A1 | 9/2020 | Gruber et al. | |
| 2021/0027772 | A1 | 1/2021 | Horev et al. | |
| 2023/0244989 | A1* | 8/2023 | Riva | G06N 3/045<br>706/11 |

OTHER PUBLICATIONS

Caroline Brun et al. "Normalization and paraphrasing using symbolic methods". Xerox Research Centre Europe, chemin de Maupertuis, Meylan France. Jul. 11, 2003. https://dl.acm.org/doi/10.3115/1118984.1118990.

* cited by examiner

SYSTEM AND METHOD FOR GENERATING REPHRASED ACTIONABLE DATA OF TEXTUAL DATA

TECHNICAL FIELD

The present disclosure relates generally to processing textual data, more specifically to techniques for generating rephrased actionable data.

BACKGROUND

In sales organizations, especially these days, meetings are conducted via teleconference or videoconference calls. Further, emails are the primary communication means for exchanging letter offers, follow-ups, and so on. In many organizations, sales calls are recorded and transcribed into textual data. Such textual data of transcribed calls, emails, and the like, are stored as corpus for subsequent review. It has been identified that such corpus pertains valuable information about the sales including, but not limited to, trend, process, progress, approaches, tactics, and more. However, due to the complexity and the sheer volume of records, reviewing these records and moreover, to derive insights is challenging and time-consuming, and in return, most of the information cannot be exploited.

Extraction of sales information from records such as calls, meetings, emails, and the like, have been performed by, for example, identification of keywords or phrases in conversations saved in the textual corpus. Identification of keywords may flag meaningful conversations to follow-up on or provide further processing and analysis. For example, identifying the word "expensive" may be utilized to improve sales process.

Current approaches to identify keywords or phrases in textual data are primarily based on textual searches or natural language processing (NLP) techniques. However, such solutions suffer from limitations, for example, the accuracy of identification of keywords and identification of keywords having a certain context. The accuracy of such identification is limited in that searches are performed based on keywords listed in a predefined dictionary.

Moreover, the current approaches of natural language understanding (NLU) are often limited to identifying and understanding the textual data without translation of such data into meaningful insights or practical usage. Without such translation of data into insights or practical use, the extracted information cannot be effectively utilized and again, may be lost. To this end, methods to analyze the large amount of textual data and to organize them into meaningful and useful data is desired.

Particularly, in the modern world, where continuous communications and sharing of information takes place through various communication means between multiple participants, it is difficult to track and monitor interactions and associated tasks with respect to each and every communication. That is, actions (or tasks) such as, following up with emails or conversations, providing information, reminders, and more, that are mentioned during communication may be overlooked and not completed. Without further analysis of the textual data, such actions that are crucial for maintaining relationships and businesses, can remain undiscovered from the vast amount of data obtained through currently implemented NLP techniques.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for generating a rephrasing model for rephrased actionable data extracted from conversations. The method comprises: receiving a training dataset including a plurality of training samples, wherein each training sample includes a textual data extracted from recorded conversations and at least one action item, wherein the at least one action item is a portion of the textual data; associating a control signal to each training sample of the training dataset, wherein the control signal is added to the associated training sample; and training a rephrasing model using the training dataset, wherein the rephrasing model is trained to paraphrase the at least one action item to output at least one actionable data, wherein each training sample of the training dataset is iteratively fed into the machine learning algorithm of the rephrasing model.

Certain embodiments disclosed herein also include a non-transitory computer readable medium having stored thereon causing a processing circuitry to execute a process, the process comprising: receiving a training dataset including a plurality of training samples, wherein each training sample includes a textual data extracted from recorded conversations and at least one action item, wherein the at least one action item is a portion of the textual data; associating a control signal to each training sample of the training dataset, wherein the control signal is added to the associated training sample; and training a rephrasing model using the training dataset, wherein the rephrasing model is trained to paraphrase the at least one action item to output at least one actionable data, wherein each training sample of the training dataset is iteratively fed into the machine learning algorithm of the rephrasing model.

Certain embodiments disclosed herein also include a system for generating a rephrasing model for rephrased actionable data extracted from conversations. The system comprises: a processing circuitry; and a memory, the memory containing instructions that, when executed by the processing circuitry, configure the system to: receive a training dataset including a plurality of training samples, wherein each training sample includes a textual data extracted from recorded conversations and at least one action item, wherein the at least one action item is a portion of the textual data; associate a control signal to each training sample of the training dataset, wherein the control signal is added to the associated training sample; and train a rephrasing model using the training dataset, wherein the rephrasing model is trained to paraphrase the at least one action item to output at least one actionable data, wherein each training sample of the training dataset is iteratively fed into the machine learning algorithm of the rephrasing model.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
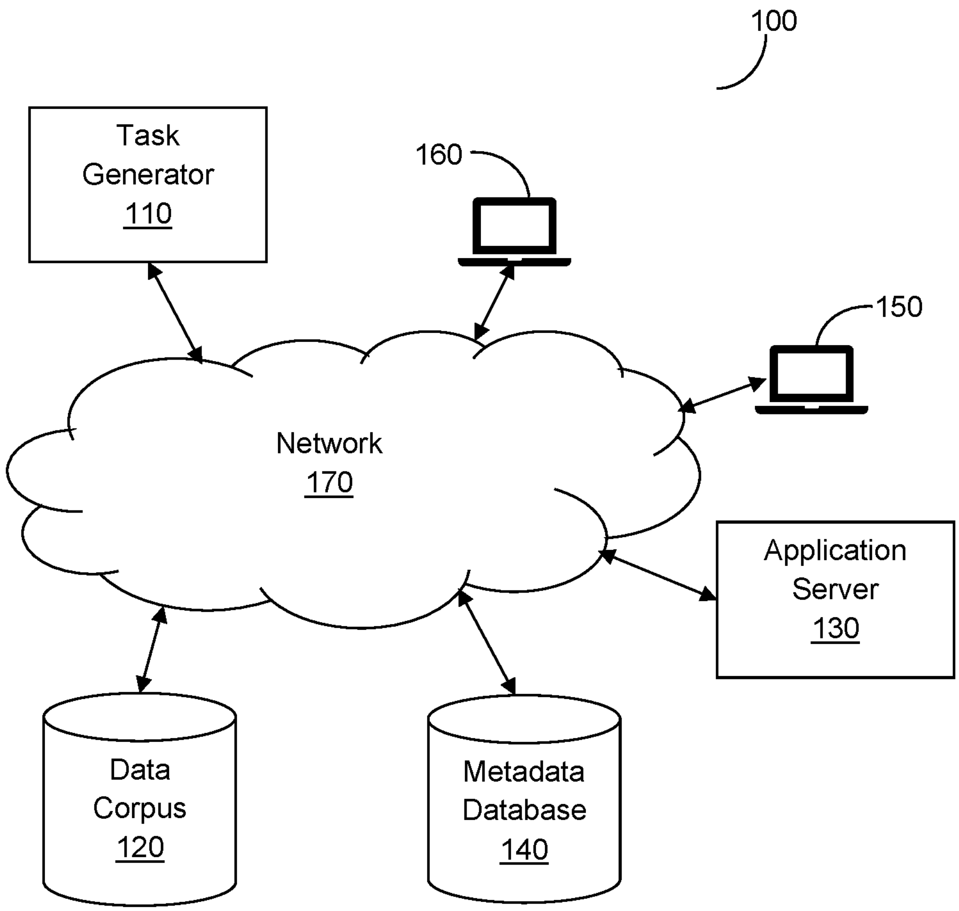
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments present a system and method for executing actionable data of textual data by generating and training a rephrasing model. An actionable data is a task that should and/or could be performed. For example, the actionable data may be reminders, to-do lists, suggestions, and more that is generated based on textual data collected from various conversations such as, videoconferences, telephonic calls, emails, text messages, chats, and the like. The disclosed embodiments utilize natural language understanding (NLU) and statistical analysis techniques to extract, rephrase, and execute such actionable data based on textual data. The actionable data are meaningful and effective translations of the vast amount of textual data collected and stored in a data corpus.

It has been identified that current language models for paraphrasing have unlimited possibilities of paraphrasing options, which can result in challenges of hallucination. That is, current language models can create paraphrased outputs that are inaccurate and undesired. To this end, the disclosed embodiments generate a rephrasing model that guides paraphrasing of texts by introducing control signals. The generated rephrasing model creates actionable data based on textual data that are aligned with the control signals to improve accuracy and consistency. Moreover, the rephrasing model may be fine-tuned to reflect preferences and need of certain groups, companies, industries, and more. It should be noted that such fine-tuning of the rephrasing model enables control over paraphrasing possibilities and reduces the output space.

According to the embodiments, an extraction model and the rephrasing model may be sequentially trained and configured to efficiently generate the actionable data. The extraction model is trained to identify specific action items, which are paraphrased to actionable data. The two-step configuration enables rapid and accurate discovery of applicable data (i.e., data that is processed for the generation of actionable data), which are taken as inputs for focused processing. It should be appreciated that the two-step configuration not only improves accuracy but provides improved processing speed and reduced processing resources required by identifying and processing action items.

FIG. 1 shows an example network diagram 100 utilized to describe the various disclosed embodiments. In the example network diagram 100, a task generator 110, a data corpus 120, an application server 130, a metadata database 140, a user terminal 150, and a customer device 160 connected to a network 170. The network 170 may be, but is not limited to, a wireless, a cellular or wired network, a local area network (LAN), a wide area network (WAN), a metro area network (MAN), the Internet, the worldwide web (WWW), similar networks, and any combination thereof.

The data corpus (or simply "corpus") 120 includes textual data from transcripts, recorded calls or conversations, email messages, chat messages, instant messages, short message systems (SMS), chat logs, and other types of textual documents. In an example embodiment, the textual data in the corpus 120 include communication records, such as email communications with customers. As an example, the textual data may include sales-related communication with a company and their customers. The corpus 120 provides textual data to the task generator 110 and the application server 130 over the network 170. In an embodiment, the data corpus 120 may include at least one actionable data associated with each of the textual data as determined by the task generator 110. In a further embodiment, the data corpus 120 may include textual data with identified action items as determined by the task generator 110.

In an example embodiment, actionable data generated from textual data may be retrieved by the application server 130 for further analysis such as, but not limited to, generating notification, alerts, opening certain documents, and the like. In a further example embodiment, the application server 130 may determine a sub-task associated with the generated actionable data. The sub-task may include additional tasks that may be suggested or performed with execution of the at least one actionable data.

In an embodiment, the corpus 120 may include a plurality of isolated groups of textual data that are grouped according to customers (or tenants), so that one isolated group may include textual data related to one customer. The isolated groups of textual data may prevent mix-up of textual data between customers to ensure privacy.

The metadata database 140 may include metadata on textual data of, for example, emails, transcribed calls, and the like, stored in the corpus 120. In an embodiment, metadata may include associated information of the textual data such as, but not limited to, participants' information, time stamp, and the like. In further embodiment, metadata may include information retrieved from customer relationship management (CRM) systems or other systems that are utilized for keeping and monitoring deals. Examples of such information includes participants of the textual data, a stage of a deal, date stamp, and so on. The metadata may be used in training of the rephrasing model in the task generator 110.

The user terminal 150 is a device, component, system, or the like, configured to provide input, such as but is not limited to, a training dataset including one or more training samples, a training sample, a plurality of templates, a control signal, and more. In the training phase, the user terminal 150 may be used to provide prompting (or instructions) and control signals to the task generator 110 and introduce additional training datasets. In some embodiments, new templates and modification of existing templates can be performed through the user terminal 150. In an embodiment, the user terminal 150 may include, but not limited to, a personal computer, a laptop, a tablet computer, a smartphone, a wearable computing device, or any other device capable of receiving and displaying textual data.

The user terminal 150 may enable trainer access to the task generator 110 and/or the application server 130. The application server 130, in some configurations, can process or otherwise analyze textual data and historical data in the corpus 120 based on the generated actionable data. The application server 130 may determine execution plans and send reminders, suggestions, and the like, based on output from the task generator 110. For example, the application server 130 can execute the actionable data (output of the task generator 110) at a specified time and format. The task generator 110 is a component of the application server 130.

According to the disclosed embodiments, the task generator 110 is configured to create a rephrasing model to generate one or more actionable data (or tasks) from the textual data stored in the corpus 120. The task generator 110 includes an extraction model (not shown) that are trained to identify at least one action item from the textual data. In an example, the extraction of action items may be from sequences of written or spoken conversation stored as textual data in the corpus 120. The action item, in the embodiment, are portions of the textual data that includes descriptions of operations that could and/or should be performed by the customer (e.g., a sales personnel). The trained extraction model may be used to output textual data including identified action items to further generate and train the rephrasing model. As an example, the output of the extraction model may be the following (including identified action items shown in bold): "I'll pass on your information to the management team and get back to you with additional details."

The rephrasing model (not shown) is created and trained to output simplified forms of the action items into actionable data (or tasks), which are, for example, but not limited to, reminders, instructions, steps, and the like, for a customer to perform. In an embodiment, a training sample in a training dataset of the rephrasing model may include textual data, identified action items from the output of the extraction model, a control signal, paraphrase versions (examples), and instructions. The control signals are utilized to direct the model to generate specific paraphrase versions that are aligned with the desired criteria, for example, but not limited to, style, industry, and more.

In an embodiment, a training sample of the rephrasing model may be generated by applying the extraction model to new set of textual data. In such a case, the action items for the new set of textual data may be determined using the trained extraction model to create additional training samples for the rephrasing model. It should be noted that such implementation of the trained extraction model overcomes limitations of available training samples.

In an embodiment, the task generator 110 is configured to determine the actionable data from input textual data by applying at least one algorithm, such as a deep learning machine learning algorithm. The actionable data may be determined by sequentially applying the trained extraction model and the rephrasing model, configured in the task generator 110, to textual data from the corpus 120. It should be noted that the output of the extraction and rephrasing models may be executed to a customer via a customer device 160. It should be further noted that the execution of generated actionable data may be performed based on an execution plan as determined at the application server 130 and discussed further below.

The extraction model and the rephrasing model, configured in the task generator 110, can have a learning mode and an identification mode, where the learning mode may include training of the models by applying an algorithm, such as a supervised machine learning algorithm, using the training datasets. The machine learning algorithms used for training may include, for example, a k-nearest neighbors (KNN) model, a gaussian mixture model (GMM), a random forest, manifold learning, decision trees, support vector machines (SVM), decision trees, label propagation, local outlier factor, isolation forest, neural networks, a deep neural network, and the like.

The task generator 110 may be realized as a physical machine (an example of which is provided in FIG. 6), a virtual machine (or other software entity) executed over a physical machine, and the like.

The customer device 160, may be, but is not limited to, a personal computer, a laptop, a tablet computer, a smartphone, a wearable computing device, or any other device capable of receiving and displaying textual data. In an embodiment, the customer device 160 is used to present and display the actionable data in forms of, for example, but not limited to, notifications, lists, reminders, and the like. The customer device is also used to present and display the textual data, for example but not limited to, emails, text messages from short message service (SMS) and applications, chat logs, and more that are received by the customer.

In an embodiment, the execution of actionable data may be supplemented by a sub-task of the at least one actionable data. The sub-task may be, for example, but is not limited to, sending an additional notification to upper management, starting an email response, retrieving a list of relevant documents, opening and/or saving a schedule on the calendar, and the like, that are performed in association to execution of the actionable data. In an embodiment, the customer (user) may interact with the presented actionable data via a graphical user interface at the customer device 160. The graphical user interface may display the executed actionable data in the various forms noted above as well as additional information related to the actionable data. In an example, the additional information may be on-going deals with the participants of the actionable data, company or sender information, and more.

It should be noted that the elements and their arrangement shown in FIG. 1 are shown merely for the sake of simplicity. Other arrangements and/or a number of elements should be considered without departing from the scope of the disclosed embodiments. For example, the task generator 110, the corpus 120, application server 130, and the user terminal 150 may be part of one or more data centers, server frames, or a cloud computing platform. The cloud computing platform may be a private cloud, a public cloud, a hybrid cloud, or any combination thereof.

Figure 2:
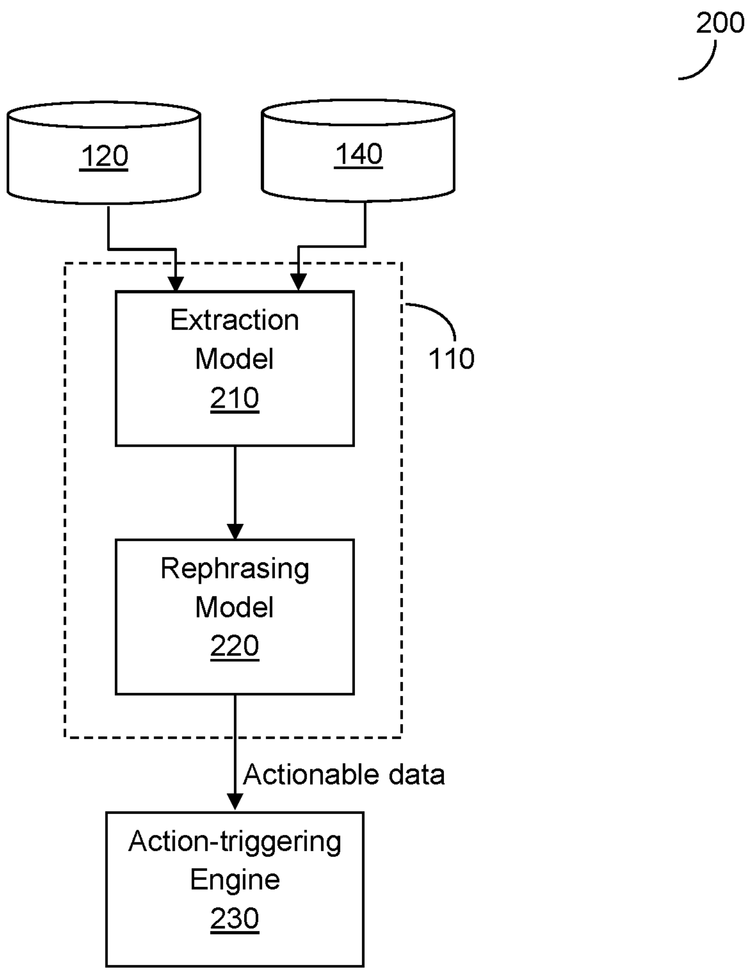
FIG. 2 is a flow diagram illustrating the generation of task generator models according to an embodiment.

FIG. 2 is an example flow diagram 200 illustrating the generation and training of an extraction model and a rephrasing model according to an embodiment, The flow diagram 200 herein may be performed within the task generator 110, FIG. 1. For simplicity and without limitation of the disclosed embodiments, FIG. 2 will also be discussed with reference to the elements shown in FIG. 1.

The flow diagram 200 is operated in two phases: learning and identification. In the learning phase, an extraction model 210 and a rephrasing model 220 are generated and trained. Training of the extraction model 210 and the rephrasing model 220 may be performed together or separately. In the identification phase, the trained extraction model 210 and the rephrasing model 220 are utilized sequentially to execute one or more actionable data (or task) of the textual data stored in the corpus 120.

In an embodiment, the extraction model 210 is a supervised classification model that can be utilized to identify action items in textual data such as, but not limited to, transcribed conversations, meeting notes, email communications, and the like. The extraction model 210 is trained using a training dataset of textual data including predefined action items and may include relevant (or positive) and irrelevant (or negative) samples. The extraction model 210 is connected to the corpus 120 and the metadata database 140 to receive textual data and associated metadata. The textual data is tokenized to, for example, a sentence, a paragraph, and the like, for input into the extraction model. In an embodiment, the trained extraction model 210 is programmed to receive a textual data from the corpus 120 to output action items identified of the textual data. In an example embodiment, the trained extraction model 210 may identify action items based on spoken text and/or other features such as, but not limited to, the timing of utterance within the call, the content that appeared on the screen during the call, and more.

As an example, a textual data from a transcribed conversation as follows may be input into the trained extraction model 210:

Screen content: Presentation

Timing: 22:43/31:20

Text: IV connect with one of my marketing pro team members and then I'll ask for some one page information and then send that over to you as well.

In the same example, the trained extraction model 210 can identify "I'll connect with one of my marketing pro team members," "I'll ask for some one page information," and "send that over to you" as action items of the input textual data. Such identified action items can be input into the rephrasing model 220 for further analysis.

The rephrasing model 220, when trained, is configured to paraphrase identified action items into simplified forms that can be presented as, for example, but is not limited to, bullet points, instructions, commands, and the like, and any combination thereof, to be presented to a customer to perform. In the learning phase, the rephrasing model 220 may be generated and trained using a plurality of input training samples each including, but is not limited to, textual data, action items identified in textual data, control signal, rephrase examples, instructions, and the like. In an embodiment, outputs from the trained extraction model may be utilized to identify the action items of the textual data in the input training sample.

It should be noted that the training dataset for the rephrasing model 220 may include new training samples that were not used for training of the extraction model 210. In an embodiment, the rephrasing model 220 is trained using machine learning algorithms, such as, but not limited to, supervised learning. In another embodiment, the rephrasing model 220 may be trained using a few-shot learning algorithm (or prompting) that enables training using only a few training samples. The rephrasing model may be based on language models, such as, but is not limited to, generative pre-trained transformer 3 (GPT-3), and the like, for text generation.

According to the disclosed embodiments, the control signal is an additional input data (in the training sample) to direct the rephrasing model 220 to generate specific paraphrases from a large possibility of paraphrases achievable from the rephrasing model 220. In an embodiment, the control signal may include, but is not limited to, demonstration of similar paraphrasing phenomenon, name of paraphrasing phenomenon, name of paraphrasing template, class of action items, beginning of output sentence, and the like. Such possible list of control signals may be predetermined and/or introduced by, for example, a training personnel through the user terminal 150. In an embodiment, the control signal may be utilized to control paraphrasing to conform to, for example, but not limited to, certain style, department, company, industry, and the like, and any combination thereof. In an embodiment, the corresponding control signal for an input textual data may be automatically determined based on analysis of the input textual data. In another embodiment, the corresponding control signal for an input textual data may be predetermined by, for example, the user terminal 150. It should be appreciated that such additional input data enables fine-tuning of the rephrasing model 220 and in return, the output for increased accuracy and efficiency.

In an embodiment, textual data may be sequentially introduced into the extraction model 210, then the rephrasing model 220 to identify the action items of the textual data immediately prior to input into the rephrasing model 220. In another embodiment, the action items may be determined by the extraction model 210 and stored in, for example, the corpus 120 or a memory (not shown), and retrieved thereafter for inputting into the rephrasing model 220.

Once trained, input data including, but not limited to, textual data, action items identified in textual data, control signals, and the like, may be retrieved from the corpus 120 and/or the metadata database 140 and input into the rephrasing model 220 to execute at least one actionable data of the input textual data. In an embodiment, the textual data may include, for example but is not limited to, entire text as whole, paragraphs, sentences, and the like. The metadata is retrieved from the metadata database 140 and may include a specific time stamp for when the communication, email for example, was received, participants in the communication, their locations, the topic of any other information from a CRM system associated with the communication, or information associated with the communication.

In an embodiment, the trained rephrasing model 220 is configured to rephrase at least one of the action items in a form of, for example, instructions or action steps based on the input data. It should be noted that paraphrasing using the trained rephrasing model 220 outputs rephrased actionable data that is aligned with the control signal.

As an example, the rephrasing model 220 may be applied to an input data with action items (shown in bold) to output actionable data (or tasks) as follows:

Input text: I'll connect with one of my marketing pro team members and then I'll ask for some one page information and then send that over to you as well.

Output: Connect with marketing pro team members

Ask for one page information

Send client one page information

The example output actionable data, "send client one page information," which is generated based on the action item "send that over to you" demonstrates that the rephrase actionable data is generated based on the combination of input data. Although the specific action items do not include details on "that" or "you," the output actionable data includes such information based on other relevant information and data. That is, actionable data is not only based on isolated analysis of identified action items, but the context and other relevant data are effectively utilized.

In an embodiment, the output actionable data may be displayed to a customer though a customer device 160 as, for example, a list of tasks. In another example embodiment, the output actionable data may be separately presented as notifications at different times, when determined to be appropriate.

According to one embodiment, the rephrasing model 220 may be configured to execute actionable data from textual data based on a predetermined set of templates, as further discussed in FIG. 5, below. The templates may be generic and common forms of actionable data that include relatively common or simple instructions and reminders. For example, the set of templates may include "Send a response email," "Set up a meeting," "Call to discuss information," and more. The predetermined set of templates may be retrieved from, for example, a memory or the corpus 120. In an embodiment, the template may be modified by applying a slot-filing model to generate actionable data based on the textual data.

According to the disclosed embodiments, the actionable data generated by the task generator 110 is fed into an action-triggering engine 230 to determine at least one execution plan of the actionable data based on further analysis of, for example, but not limited to, input textual data, associated metadata, historical data, other relevant textual data, and the like, and any combination thereof. In an embodiment, the actionable data may be presented, by the action-triggering engine 230, to a customer based on determined execution plan that defines for example, but not limited to, certain time, date, notification, bullet points, one or more customers, and the like. In an embodiment, the executed plan may a predetermined by, for example, a user of the user terminal 150 or a customer of the customer device 160. In further embodiment, sub-tasks may be determined and associated for certain actionable data that may be executed together with execution of the actionable data to the customer. In some embodiment, the action-triggering engine 230 may be a component of the application server 130.

It should be noted that the embodiments disclosed herein that describes extraction of action items and rephrasing for actionable data are provided for teaching purposes and can be utilized for generating non-actionable data without departing from the scope of the disclosure. That is, the extraction model 210 and the rephrasing model 220 may be trained to generate, and thus execute, non-actionable data (e.g., simplified form of objection, simplified form of demand, simplified form of complaints, and more) according to an execution plan and not limited to actionable data (or tasks).

As an example, the extraction model 210 may be trained to identify objection items from the input textual data, which together is input into the rephrasing model 220 to output simplified paraphrased forms of the identified objection items. In this example, an objection item of "timeline is much longer" may be identified from the textual data "We need the product as soon as possible. That estimated timeline is much longer than our need." Following the same example, a simplified paraphrased output of "timeline does not work" may be executed as an immediate notification to upper management to show objection (i.e., concerns) of the participant of, for example, the telephonic conversation.

It should be noted that the extraction model 210 and the rephrasing model 220 can be realized as or executed by as one or more hardware logic components and circuits. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

Figure 3:
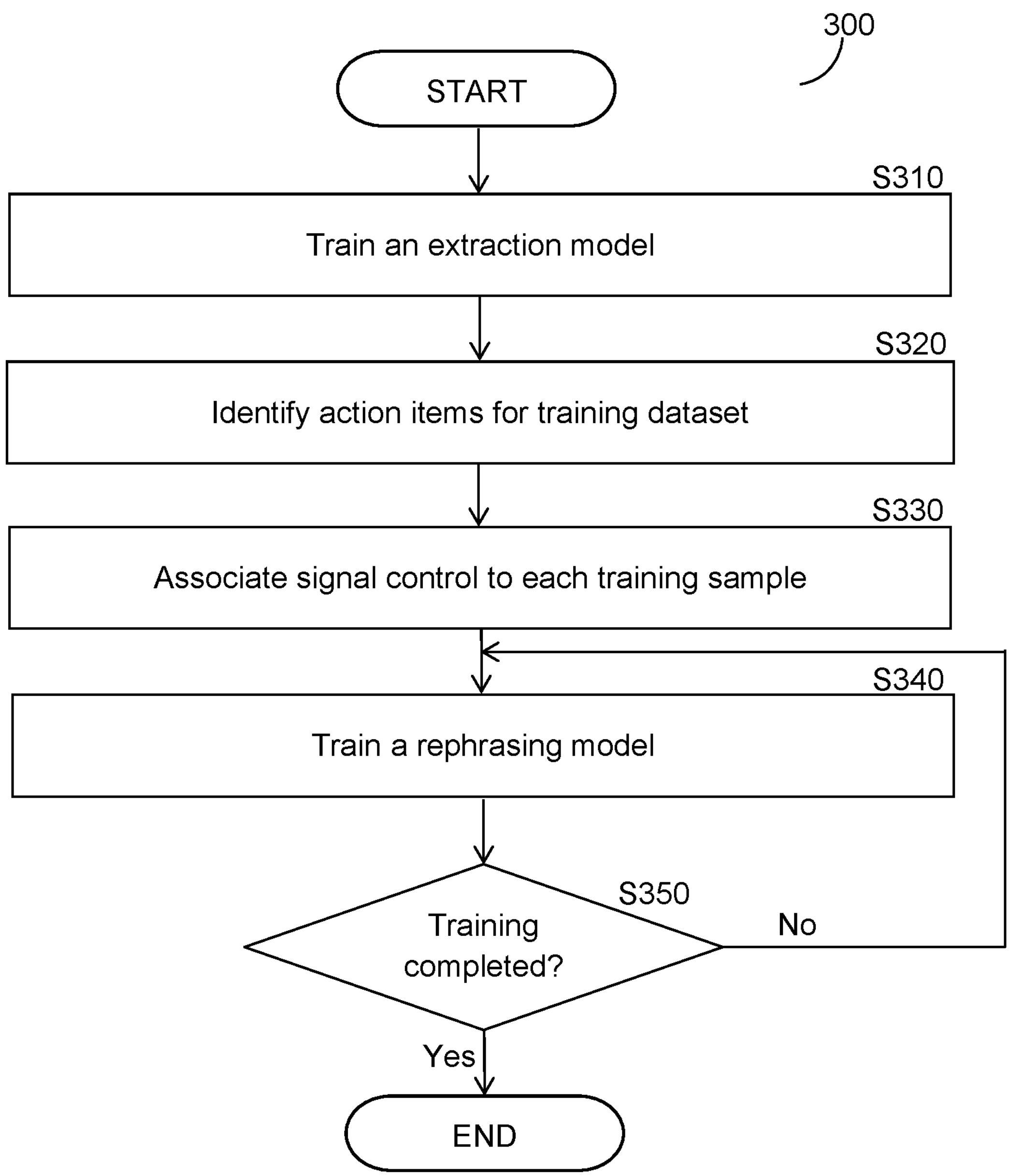
FIG. 3 is flowchart illustrating a method for generating a rephrasing model according to an embodiment.

FIG. 3 is an example flowchart 300 illustrating a method for generating and training a rephrasing model according to an embodiment. The method described herein may be executed by the task generator 110, FIG. 1. In some example embodiments, models in the task generator 110 may be realized as a neural network, a deep neural network, and the like, to run, for example, a supervised learning and semi-supervised learning.

At S310, an extraction model is trained. At least one algorithm, such as a supervised machine learning algorithm, is applied to a first training datasets such as, but is not limited to, at least one textual data and predefined action items for the at least one textual data. The training dataset may include relevant (or positive) and irrelevant (or negative) samples. It should be noted that a previously trained extraction model can be implemented for the method described herein. The training of the extraction model may be repeatedly performed until determined to be well trained. The decision to stop training of the extraction model may be determined by a training personnel at the user terminal (e.g., the user terminal 150, FIG. 1) or after a predetermined number of iterations.

At S320, action items are identified using the trained extraction model. A second training dataset including training samples of textual data are input into the trained extraction model to determine action items in each of the textual data. Such textual data may include for example, but not limited to, transcribed conversations, emails, SMS, chat log, and the like. In an embodiment, the second training dataset is a new training dataset that was not previously used for training the extraction model. In such case, the trained exaction model is applied to identify action items in the textual data that can be used for training of the rephrasing model. In another embodiment, the first training datasets including predefined action items may be utilized for training of the rephrasing model without identifying the action items from the trained extraction mode.

At S330, control signal is associated with each of the training samples of the second training dataset. The control signal is introduced together with training sample to direct and guide output of the rephrasing model. In an embodiment, the control signal may include, for example, but not limited to, demonstration of similar paraphrasing phenomenon, name of paraphrasing phenomenon, name of paraphrasing template, class of action items, beginning of output sentence, and the like.

It should be noted that the control signal enables customized training of the rephrasing model to paraphrase the input textual data that are aligned with, for example, style, company, department, and the like, and any combination thereof. In an embodiment, the control signal may be retrieved from a corpus and/or metadata database (e.g., the corpus 120 and metadata database 140, FIG. 1). In another embodiment, the control signal may be determined by a training personnel via a user terminal (e.g., the user terminal 150, FIG. 1).

At S340, a rephrasing model is trained using the generated training samples. Each generated training sample of the training dataset for the rephrasing model include, for example, but not limited to, textual data, identified action items (S320), control signal (S330), and instructions, and the like. In an embodiment, at least one algorithm, such as, but not limited to, supervised machine learning algorithm or a few-shot learning algorithm, may be applied to train the rephasing model. The rephrasing model is configured to process such input training samples to generate actionable data by paraphrasing the textual data in the input training samples. In an embodiment, the trained rephrasing model is fine-tuned for generating actionable data that are aligned to certain guidelines such as, but not limited to, style, department, topics, industry, and the like, and any combination thereof.

At S350, a check is performed whether the rephrasing model is trained and ready for use in an identification phase. If so, execution ends; otherwise, execution returns to S340 and continues training. In an embodiment, the decision to stop the training may be based on the available training datasets and/or based on the training rules. In another embodiment, the decision on when to stop the training may be taken by a user accessing the user terminal (e.g., the user terminal 150, FIG. 1) or after a predefined number of iterations is completed.

Figure 4:
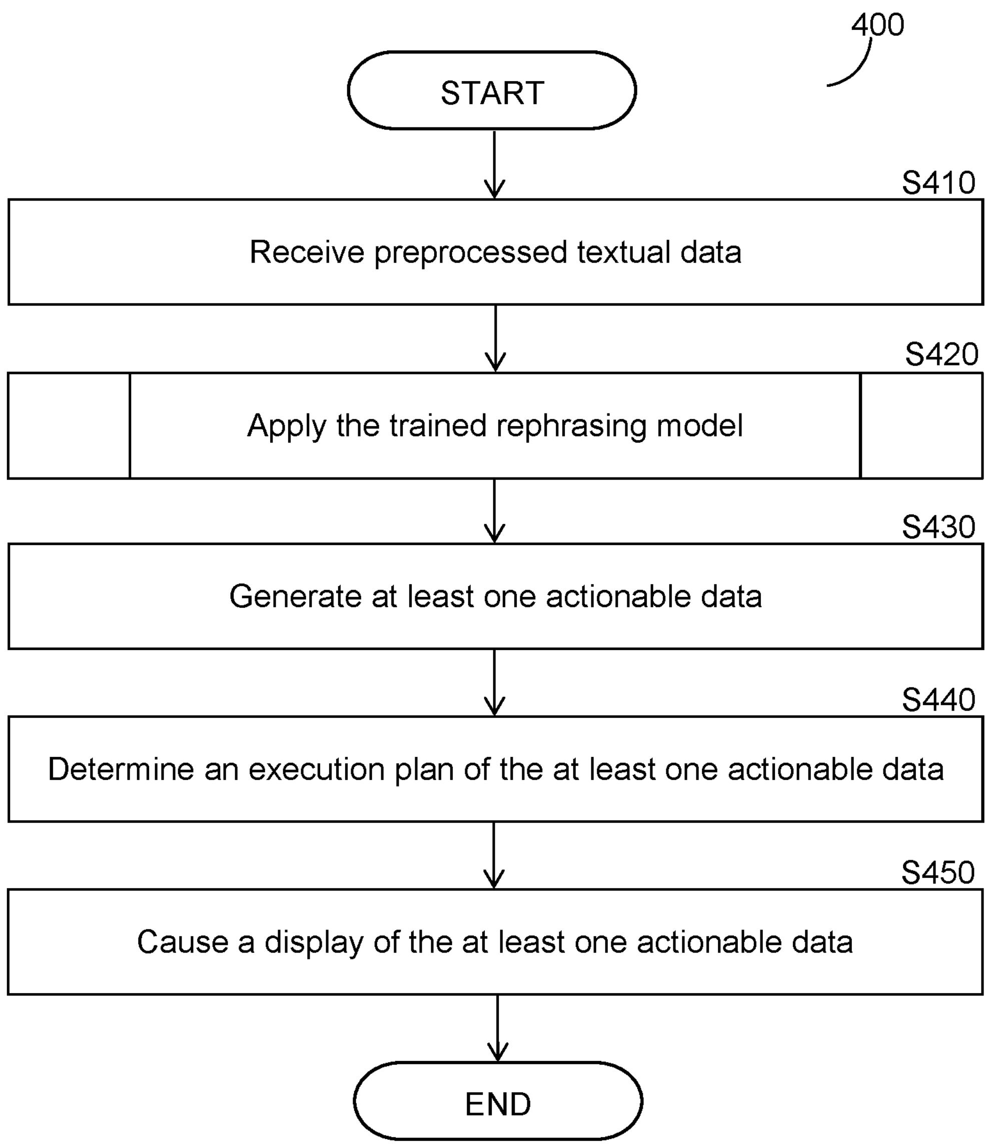
FIG. 4 is a flowchart illustrating a method for executing actionable data for textual data according to an embodiment.

FIG. 4 is an example flowchart 400 illustrating a method for executing actionable data for textual data according to an embodiment. The method described herein may be executed by the application server 130 including the task generator 110, FIG. 1.

At S410, a preprocessed textual data is received. The preprocessed textual data includes within action items that are identified by processing through the trained extraction model. The textual data may be for example, without limitation, transcript of conversations, email messages, electronic messages over Short Message Systems (SMS) and applications, and more. In an embodiment, the preprocessed textual data may be received from the corpus with associated metadata from the metadata database (e.g., the corpus 120 and the metadata database 140, FIG. 1). In another embodiment, the preprocessed textual data may be received directly from the output of the extraction model. In an example embodiment, the textual data may be a portion of the videocall between a customer and a salesperson and include metadata associated with the textual data such as, but is not limited to, time stamp, date, participant names, and the like, and any combination thereof. It should be noted the certain preprocessed textual data determined not to include action items may not be received and thus, not processed in the next steps of the method descried herein, which can effectively preserve processing power.

At S420, the trained rephrasing model is applied to the received textual data. The preprocessed textual data including at least one action item in the textual data, a control signal, and metadata is input into the trained rephrasing model. In an embodiment, the rephrasing model is configured to generate paraphrased tasks (or actionable data) that are closely aligned to desired and trained output according to the control signal. In an embodiment, algorithm, such as, but not limited to, a beam search algorithm may be applied in the rephrasing model to increase accuracy and reduce processing burden.

At S430, at least one actionable data is generated as an output of the trained rephrasing model. The at least one actionable data is a paraphrased form of the at least one action item of the textual data based on additional data and metadata associated with the textual data. In an embodiment, the output actionable data may be customized according to the control signal to be aligned with desired, for example, style and/or industry. It should be noted such customization improves accuracy and consistency of output actionable data. As an example, an actionable data "Call the client with more information" may be generated as an output from the input textual data "I will call you with more information once you return from vacation." In an embodiment, the generated at least one actionable data may be stored in a memory (not shown) and/or the corpus (e.g., the corpus 120, FIG. 1). In another embodiment, the at least one actionable data may be directly fed into the application server (e.g., the application server 130, FIG. 1).

At S440, an execution plan of the at least one actionable data is determined. The execution plan defines a process in which the at least one actionable data is executed for a customer for the customer device (e.g., the customer device 160, FIG. 1). In an example embodiment, the execution plan may include, for example, but is not limited to, certain timing (e.g., date, day, time of day, and more), method of displaying (e.g., notification, bullet points, and more), specific customer (e.g., one salesperson, upper management person, and more), and the like, and any combination thereof. In an embodiment, the execution plan may be determined based on execution rules applying, for example, but not limited to, input textual data, metadata, historical data, and the like. The historical data is textual data and/or actionable data stored in the corpus (e.g., the corpus 120, FIG. 1) that are relevant to the input textual data. Here, relevance may be defined as, for example, but is not limited to, sharing common recipients, textual data from the same videoconference, textual data from the same email thread, and the like. Moreover, historical data may include information about recipients, associated company, industry, and the like, and any combination thereof.

Continuing with the example above, an email communication thread may include the input textual data of "I will call you with more information once you return from vacation" and other relevant textual data of "I will be on vacation until June $3^{rd}$." In such example, an execution plan for the actionable data "Call the client with more information" may be determined execute the actionable data on June $4^{th}$ as a reminder notification through the customer device (e.g., the customer device 160, FIG. 1). In an embodiment, a unique execution plan may not be determined for the at least one execution plan and executed according to a standard plan, for example, immediately presenting to a customer as an alert. In a further embodiment, the standard plan may be personalized for a customer and/or a group of customers.

In another embodiment, a sub-task may be determined for the at least one actionable data. The sub-task is a supplementary task that may be associated and performed with execution of the at least one actionable data to streamline implementation of tasks for the customers. In an example, the sub-task may be starting a new email response including recipient and pricing documents to an email that needs follow up. In another non-limiting example, the sub-task may be displaying a list of documents related signing of the contract when the actionable data indicates "send documents to finalize contract." In yet another non-limiting example, the sub-task may be creating an email response with an attachment of a suitable case study to provide more information of input textual data voicing concern from the recipient. In an embodiment, the sub-task may be determined based on, for example, but not limited to, input textual data, historical data, and the like.

At S450, the at least one actionable data is caused to be displayed to a customer. The at least one actionable data is presented according to the determined execution plan. In some embodiments, an associated sub-task may be performed when the at least one actionable data is caused to be displayed. In an embodiment, the at least one actionable data may be displayed to the customer via a customer device (e.g., the customer device 160, FIG. 1). In a further embodiment, the customer may interact with the displayed actionable data via a graphical user interface. In some embodiments, the at least one actionable data may be automatically removed from a list (e.g., list of actionable data stored in a memory) when the actionable data is executed and/performed by a customer. For example, actionable data to "Schedule a meeting" is removed once executed to the customer and a calendar invite is sent out.

Figure 5:
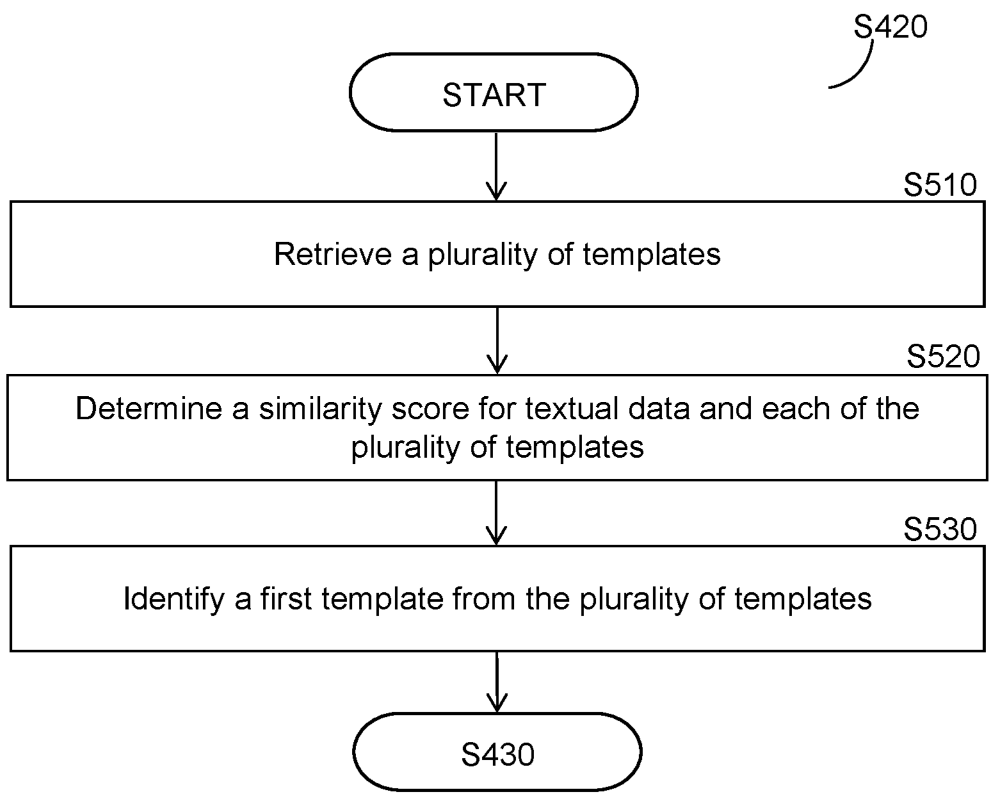
FIG. 5 is a flowchart illustrating a method for generating actionable data according to one embodiment.

FIG. 5 is an example flowchart S420 illustrating a method for applying a rephrasing model for executing actionable data according to one embodiment. A template-based approach is applied to generate the at least one actionable data for execution. It should be noted that the method described herein includes details that may be performed within S420 of the method of FIG. 4 above. The method described herein may be executed by the task generator 110, FIG. 1.

At S510, a plurality of templates is retrieved. The plurality of templates is predetermined and retrieved from, for example, a memory or a corpus (e.g., the corpus 120, FIG. 1). In an embodiment, each template of the plurality of templates is a generic template for tasks that are routinely performed at, for example, with limitations, a company, department, industry, and more. In a non-limiting example embodiment, the plurality of templates may include "set a follow-up meeting," "schedule a meeting for next week," "respond to email," "send more information," and the more.

At S520, a similarity score for each of the plurality of templates and the input textual data is determined. In an embodiment, the similarity score may be determined by matching an action item of the input textual data to each of the plurality of templates. The action items are identified in the preprocessed textual data as determined by the trained extraction model. In an embodiment, the plurality of templates may be ranked according to the determined similarity scores for a specific action item. That is, separate list of rankings may be determined for each of the action items identified in the input textual data. As an example, an action item "I'll send you pricing information" may rank the "Send more information" template higher over "Respond to email."

At S530, a first template from the plurality of templates is determined. The first template of the plurality of templates is determined to have the highest similarity score (computed at S520) with respect to the action item. In an embodiment, additional information may be extract from the input textual data from which the action item was extracted from. The additional information may include, for example, but not limited to, participants (e.g., who to send email, who to call, other contacts, and more), time (e.g., next week, date, time, and more), attachment (e.g., FAQ document, pricing information, and more), communication type (e.g., videoconference, in-person, email, and more), and the like, and any combination thereof.

It should be noted that the determined first template and additional information may be incorporated to generate at least one actionable data and continue with S430 of FIG. 4 as described above. In an embodiment, additional information may be applied to the first template using model, for example, but not limited to, a slot-filling model, to generate the at least one actionable data including the additional information. Following the above example, a preprocessed textual data of "I'll send you the pricing information by Wednesday afternoon" (including identified action item in shown in bold) is received, and the first template is determined as "Send more information." In such scenario, additional information on the attachment (pricing information) and the time (Wednesday afternoon) may be extracted and applied to generate the actionable data of "Send pricing information by Wednesday afternoon."

Figure 6:
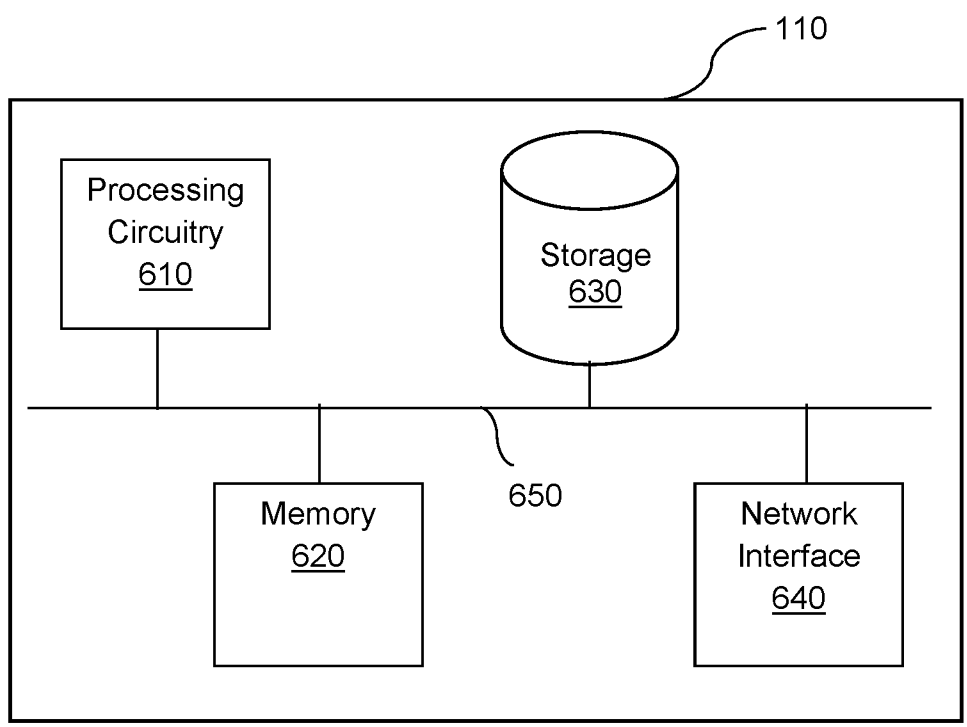
FIG. 6 is a schematic diagram of a task generator according to an embodiment.

FIG. 6 is an example schematic diagram of a task generator 110 according to an embodiment. The task generator 110 includes a processing circuitry 610 coupled to a memory 620, a storage 630, and a network interface 640. In an embodiment, the components of the task generator 110 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose central processing units (CPUs), microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the task generator 110 to communicate with other elements over the network 170 for the purpose of, for example, receiving data, sending data, and the like.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), general purpose compute acceleration device such as graphics processing units ("GPU"), a memory, and input/output interfaces. The computer platform may also include an operating system and microinstruction code. The various processes and functions described herein may be either part of the microinstruction code or part of the application program, or any combination thereof, which may be executed by a CPU or a GPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a trained rephrasing model for rephrased actionable data extracted from conversations via a two-step model architecture, comprising:

training an extraction model using a first training dataset including a plurality of textual data associated with at least one predefined action item to identify specific actions from a plurality of textual data items;

receiving a second training dataset including a plurality of training samples, wherein each training sample includes textual data extracted from recorded conversations;

identifying, via the trained extraction model, at least one action item from the textual data extracted from the recorded conversations, wherein the at least one action item is a portion of the textual data, and wherein the trained extraction model outputs the identified at least one action item for inclusion in the second training dataset;

associating a control signal to each training sample of the second training dataset, wherein the control signal is added to the associated training sample, wherein the control signal directs a rephrasing model to generate specific paraphrase versions of input data that are aligned with desired output criteria; and training the rephrasing model using the second training dataset that includes the identified at least one action item and the associated control signal, wherein the rephrasing model is trained to paraphrase the at least one action item to output at least one actionable data in at least one of the specific paraphrase versions according to the control signal, wherein the training further comprises iteratively feeding each training sample of the second training dataset into a machine learning algorithm of the rephrasing model.

2. The method of claim 1, wherein the training sample further includes paraphrase versions, instructions, and metadata.

3. The method of claim 1, wherein the control signal is any one of: demonstration of a similar paraphrasing phenomenon, name of paraphrasing phenomenon, name of paraphrasing template, class of action items, and beginning of output sentence.

4. The method of claim 1, wherein outputting the at least one actionable data further comprises:

receiving a preprocessed textual data including the textual data, the at least one action item, and the control signal; and generating the at least one actionable data based on the preprocessed textual data.

5. The method of claim 4, further comprising:

determining an execution plan of the generated at least one actionable data based on at least one of: the preprocessed textual data, associated metadata, and historical data; and causing a display of the at least one actionable data based on the determined execution plan.

6. The method of claim 4, further comprising:

retrieving a plurality of templates, wherein each template is a simplified rephrasing example;

determining a similarity score for each template of the plurality of templates, wherein the similarity score is determined by matching the textual data and the each template of the plurality of templates;

identifying a first template from the plurality of templates, wherein the first template is a template that has a highest similarity score when matched with the textual data; and applying a slot-filling algorithm on the identified first template.

7. The method of claim 1, further comprising:

identifying the at least one action item by feeding the textual data into the trained extraction model;

generating a preprocessed textual data to include the identified at least one action item; and storing the preprocessed textual data in a data corpus.

8. The method of claim 1, wherein the textual data includes any one of: a transcript of a call, a transcript of conversations, an email, a short message service (SMS), and a chat log.

9. A non-transitory computer readable medium having stored thereon instructions for causing a processing circuitry to execute a process, the process comprising:

training an extraction model using a first training dataset including a plurality of textual data associated with at least one predefined action item to identify specific actions from a plurality of textual data items;

receiving a second training dataset including a plurality of training samples, wherein each training sample includes textual data extracted from recorded conversations;

identify, via the trained extraction model, at least one action item from the textual data extracted from the recorded conversations, wherein the at least one action item is a portion of the textual data, and wherein the trained extraction model outputs the identified at least one action item for inclusion in the second training dataset;

associating a control signal to each training sample of the second training dataset, wherein the control signal is added to the associated training sample, wherein the control signal directs a rephrasing model to generate specific paraphrase versions of input data that are aligned with desired output criteria; and training the rephrasing model using the second training dataset that includes the identified at least one action item and the associated control signal, wherein the rephrasing model is trained to paraphrase the at least one action item to output at least one actionable data in at least one of the specific paraphrase versions according to the control signal, wherein the training further comprises iteratively feeding each training sample of the second training dataset into a machine learning algorithm of the rephrasing model.

10. A system for generating a trained rephrasing model for executing actionable data of textual data via a two-step model architecture, comprising:

a processing circuitry; and a memory, the memory containing instructions that, when executed by the processing circuitry, configure the system to:

train an extraction model using a first training dataset including a plurality of textual data associated with at least one predefined action item to identify specific actions from a plurality of textual data items;

receive a second training dataset including a plurality of training samples, wherein each training sample includes textual data extracted from recorded conversations;

identify, via the trained extraction model, at least one action item from the textual data extracted from the recorded conversations, wherein the at least one action item is a portion of the textual data, and wherein the trained extraction model outputs the identified at least one action item for inclusion in the second training dataset;

associate a control signal to each training sample of the second training dataset, wherein the control signal is added to the associated training sample, wherein the control signal directs a rephrasing model to generate specific paraphrase versions of input data that are aligned with desired output criteria; and train the rephrasing model using the second training dataset that includes the identified at least one action item and the associated control signal, wherein the rephrasing model is trained to paraphrase the at least one action item to output at least one actionable data in at least one of the specific paraphrase versions according to the control signal, wherein the training further comprises iteratively feeding each training sample of the second training dataset into a machine learning algorithm of the rephrasing model.

11. The system of claim 10, wherein the training sample further includes paraphrase versions, instructions, and metadata.

12. The system of claim 10, wherein the control signal is any one of: demonstration of a similar paraphrasing phenomenon, name of paraphrasing phenomenon, name of paraphrasing template, class of action items, and beginning of output sentence.

13. The system of claim 10, wherein the system is further configured to:

receive a preprocessed textual data including the textual data, the at least one action item, and the control signal; and generate the at least one actionable data based on the preprocessed textual data.

14. The system of claim 13, wherein the system is further configured to:

determine an execution plan of the generated at least one actionable data based on at least one of: the preprocessed textual data, associated metadata, and historical data; and cause a display of the at least one actionable data based on the determined execution plan.

15. The system of claim 13, wherein the system is further configured to:

retrieve a plurality of templates, wherein each template is a simplified rephrasing example;

determine a similarity score for each template of the plurality of templates, wherein the similarity score is determined by matching the textual data and the each template of the plurality of templates;

identify a first template from the plurality of templates, wherein the first template is a template that has a highest similarity score when matched with the textual data; and apply a slot-filling algorithm on the identified first template.

16. The system of claim 10, wherein the system is further configured to:

identify the at least one action item by feeding the textual data into the trained extraction model;

generate a preprocessed textual data to include the identified at least one action item; and store the preprocessed textual data in a data corpus.

17. The system of claim 10, wherein the textual data includes any one of: a transcript of a call, a transcript of conversations, an email, a short message service (SMS), and a chat log.

* * * * *